E. F. CHANDLER.
MEANS FOR FIRE CONTROL FOR DIRIGIBLE DEVICES.
APPLICATION FILED JAN. 12, 1915.
1,249,274.
Patented Dec. 4, 1917.
2 SHEETS—SHEET 1.
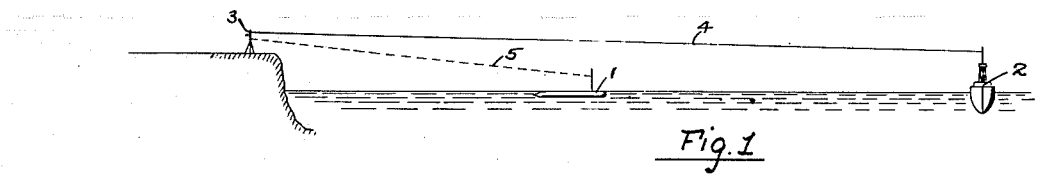
Fig. 1
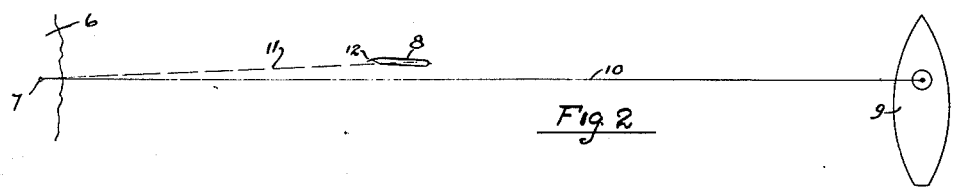
Fig. 2
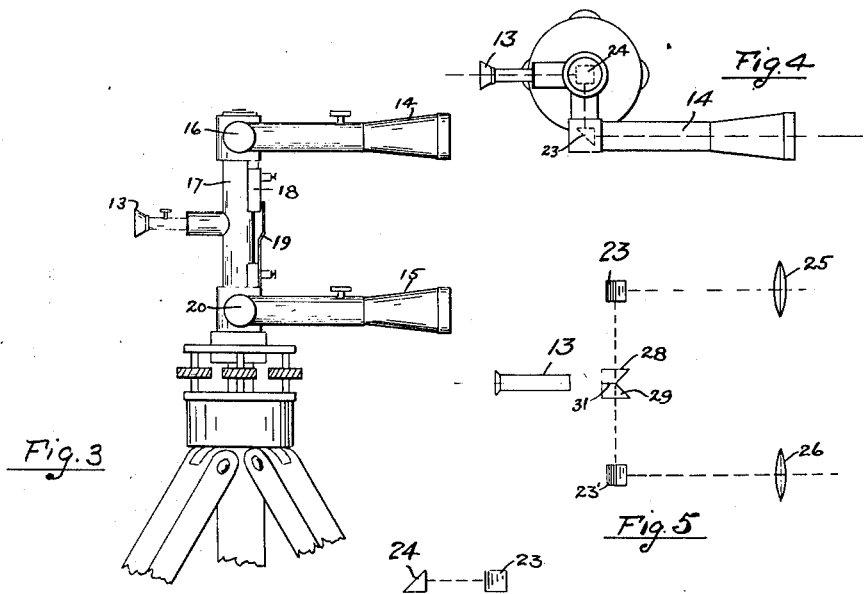
Fig. 3
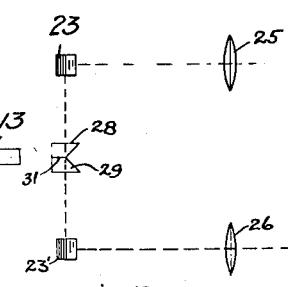
Fig. 4
Fig. 5
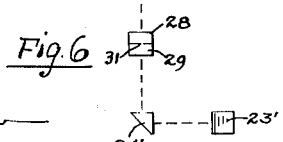
Fig. 6
Inventor
Edw. F. Chandler
By his Attorney E. F. CHANDLER.
MEANS FOR FIRE CONTROL FOR DIRIGIBLE DEVICES.
APPLICATION FILED JAN. 12, 1915.
1,249,274.
Patented Dec. 4, 1917.
2 SHEETS—SHEET 2.
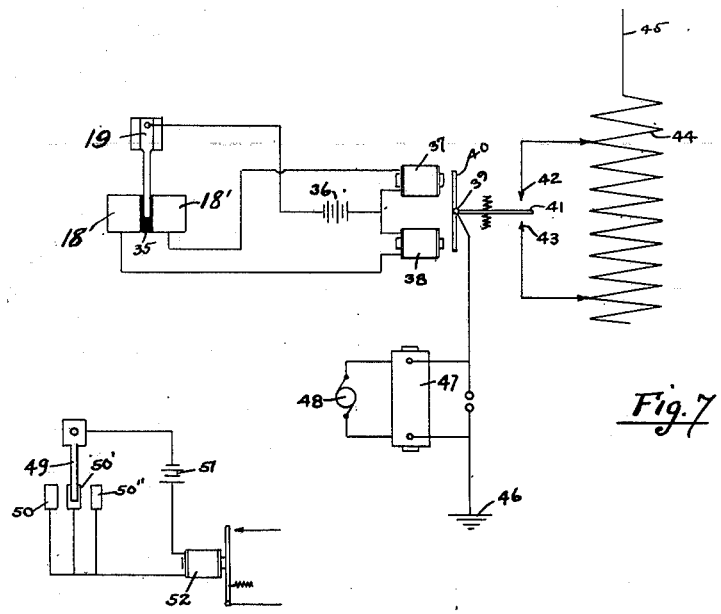
Fig. 7
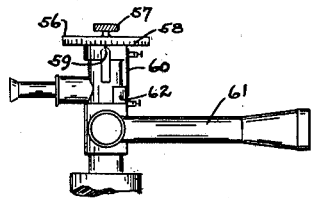
Fig. 8
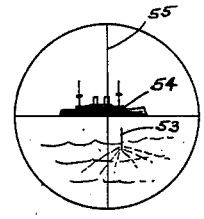
Fig. 9
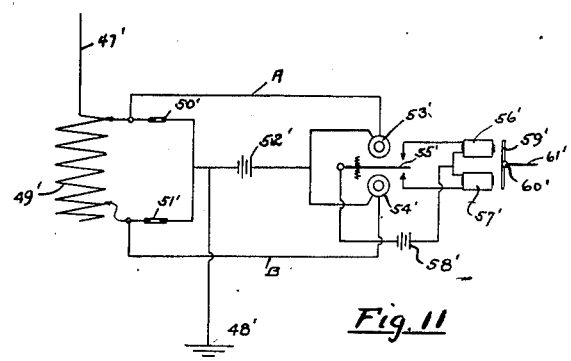
Fig. 10
Fig. 11
Witnesses:
Inventor
Edw. F. Chandler
By his Attorney

UNITED STATES PATENT OFFICE.

EDWARD F. CHANDLER, OF WOODHAVEN, NEW YORK, ASSIGNOR TO CHANDLER DEVELOPMENT CORPORATION, A CORPORATION OF NEW YORK.

MEANS FOR FIRE CONTROL FOR DIRIGIBLE DEVICES.

1,249,274.

Specification of Letters Patent.

Patented Dec. 4, 1917.

Application filed January 12, 1915. Serial No. 1,874.

*To all whom it may concern:*

Be it known that I, EDWARD FARRINGTON CHANDLER, a citizen of the United States, residing in Woodhaven, in the county of Queens and State of New York, have invented certain new and useful Improvements in Means for Fire Control for Dirigible Devices, of which the following is a full, clear, and exact description, reference being had to the accompanying drawings, forming a part of this specification.

This invention pertains to a system for accurately directing the course of torpedoes, aeroplanes and other dirigible devices adapted to be steered from a controlling station and provides a method for accurately despatching such a device over a desired course automatically. My method is based on the application of sighting means adapted to be pointed at the dirigible device along its travel, used in connection with suitable devices whereby the operation of the controlling station is governed so as to exert a correcting action on the dirigible device when the same deviates from the firing line. In other words I provide a method of fire control where the deviations of the line of sight of an instrument pointed at the dirigible device along its travel are used to automatically operate a wireless controlling station according to the nature of said deviations.

An apparatus adapted to be used in connection with my invention can be conceived in many different forms, but for the sake of clarity in the annexed drawings, I illustrate a form of sighting means which is especially designed for this purpose, the same comprising a member which can be pointed at the target and another member which can be pointed at the dirigible device, which is being despatched toward the same. The device illustrated is arranged in such a manner in connection with a wireless control station adapted to control the steering apparatus of the dirigible device, that when both lines of vision are parallel, the steering effect on the said dirigible device is neutral, but when the dirigible device deviates from the line of sight of the target observing member, and the other member pointed at the device is therefore set out of parallel alinement, a corrective steering effect will be impressed upon the dirigible device, tending to steer the same back toward the line of sight.

In the annexed drawings, Figure 1 is a view in elevation of a torpedo being directed against a target;

Fig. 2 is a plan view showing a torpedo deviated from the line of sight of the target;

Fig. 3 illustrates in elevation the preferred form of sighting device adapted to be used in connection with my method;

Fig. 4 is a plan view of the same;

Fig. 5 is a diagrammatic side view in elevation and Fig. 6 is a diagrammatic front view in elevation of the internal arrangement of lenses and prisms in the instrument illustrated in Figs. 3 and 4;

Fig. 7 illustrates diagrammatically an electrical circuit which may be employed in connection with the instrument illustrated in Figs. 3 and 4 in order to obtain an automatic operation of a wireless controlling station;

Fig. 8 illustrates diagrammatically a modified form of electromagnetic circuit also adapted to be used in connection with automatic operation of a wireless controlling station;

Fig. 9 illustrates the field of vision as seen by an observer located at the eyepiece of the instrument illustrated in Figs. 3 and 4;

Fig. 10 is a side view in elevation of a modified form of sighting device;

Fig. 11 is a conventional diagrammatic illustration of an electromagnetic circuit adapted to be influenced by the waves sent by the controlling station and to accordingly govern the operation of the steering member of the dirigible device.

Fig. 1 illustrates diagrammatically a torpedo 1 being directed against an enemy 2 by means of a fire control device located at 3, in which 4 is a line of sight toward the enemy and 5 is the line of sight toward the dirigible vessel.

Fig. 2 illustrates diagrammatically in plan a shore line 6, a fire control apparatus 7, a torpedo 8 and the enemy 9, in which 10 is the line of sight toward the enemy and 11 is the line of sight toward the dirigible device 8. As indicated, torpedo 8 is to the left of the vision line 10 and consequently the rudder 12 has been shifted so as to steer 8 toward the said line 10.

Fig. 3 illustrates in elevation a form of sighting device which can be used in connection with my invention in which 13 is a suitable eyepiece and 14 is a suitable objective tube as is also 15. Objective tube 14, which is pivoted about a point 16, is employed as a means for sighting the enemy or target. This objective tube may be swung in a horizontal plane about the standard 17. Carried by the upper objective tube 14 is a suitable contact block 18, resting against said contact block is a contact finger 19. 19 is connected by suitable means to the objective tube 15, which as in the case of 14 also has movement about a center 20 as well as horizontal movement about the center standard 17. By means of a suitable system of optical prisms an observer stationed at the eyepiece 13 is enabled to see through both of the objective tubes 14 and 15, so that it is possible for him to observe two different objects at the same time. When both objective tubes are parallel vertically or one directly above the other, contact finger 19 will rest in the center of the contact pad 18, as will be more fully disclosed hereinafter.

Fig. 4 represents diagrammatically the instrument in plan in which 14 is one of the telescope tubes and 13 is the eyepiece. 23 is a suitable prism as is 24, by means of which as shown in Figs. 5 and 6, the telescope objectives are brought into optical communication with eyepiece 13.

Fig. 5 is a side elevation in which 25 is one of the telescope objectives and 26 the other and in which 23 and 23' are prisms corresponding with 23 in Fig. 4. 28 and 29 are prisms adapted to present the views received through 25 and 26 to the eyepiece 13, the division line 31 between two said prisms serving to separate the observed field into two hemispheres.

Fig. 6 is a front elevation showing how the rays received by 23, 23' are respectively deflected by means of prisms 24, 24' toward prisms 28, 29.

Fig. 7 illustrates diagrammatically an electric circuit which may be employed in carrying out the operation of my invention in which 19 is a contact finger adapted to come in contact with contact pads 18, 18'. 35 is an insulated space. It will be obvious that when both objective tubes are moved together in a horizontal plane, contact finger 19 will remain upon 35, but if one objective tube is moved either to the right or to the left in relation to the other, the contact finger will engage pad 18 or 18'. 36 is a battery or other suitable source of current, 37 and 38 are suitable electromagnets, fulcrumed at 39 is an armature 40 carrying a lever arm 41.

Now it will be seen that if the contact finger 19 is brought into operative relation with 18 or 18', magnet 37 or 38 will become energized causing the armature 40 to be tilted and resulting in a contact between the lever arm 41 and the point 42 or 43. 44 is a suitable tuning coil such as is used in wireless telegraphy, more or less of which is adapted to be brought into operation by the contact arm 41. 45 is an antenna. 46 is a ground connection. 47 is a suitable transformer for the production of electromagnetic waves. 48 is a source of current such as a dynamo.

From the above it will be seen that as contact finger 19 complete a circuit through 18 or 18', one or the other part of the tuning coil 44 will be brought into operative relation with the transmitting apparatus 47 so that, for convenience of illustration, we will consider that wave trains of different frequencies will be transmitted to the receiving apparatus, located upon the dirigible device under control.

In Fig. 8, 49 is a contact finger, 50, 51' and 50" are contact pads. 51 is a suitable source of current such as a battery. 52 is an electromagnet or relay. This diagram illustrates a modification in which the electromagnet 52 is maintained in an energized state as long as both of the objective tubes are parallel, the circuit being broken, however, as the objective tubes are moved out of their parallel relation either to the right or to the left in a horizontal plane. It will be obvious that relay 52 in turn may be suitably connected with a wave sending device, so that the sending of radiant energy will be governed by movements of member 49 which, as will be understood, will be suitably associated with the pointing or sighting means. Obviously as contact is broken between member 49 and one of the pads 50, 50' or 50" the relay will be actuated, which said actuation can be made to function a wave transmitter, as for instance, each time the circuit is interrupted, or in any other suitable simple manner.

Fig. 9 represents the field of vision as seen by the observer located at the eyepiece 13 in Fig. 3. 54 is the target or enemy which is seen in the upper hemisphere and which is bisected by the vertical line or cross wire 55; in the lower hemisphere 53 is a view of the controlled dirigible device which it is desired to bring in line with 55 for the purpose mentioned.

Fig. 10 represents in side elevation a modified form of sighting device and in which the observation tube, shown at 14 in Fig. 3, is dispensed with and in its place is substituted a graduated dial 56 adapted to be revolved in any suitable manner, as by a knob 57, so as to bring the graduation 56 past the index mark 59. Carried by the graduated disk 56 is a contact device 60 similar to the one carried by the upper telescope as previously described. The objective tube 61, which corresponds with objective tube 15 in Fig. 3, carries a suitable contact pad 62. In this modification the position of the contact finger 60 will be determined, not by direct vision, but by the relation between certain graduations 58 and the index 59, which have been transmitted to the observer by operators equipped with range finders of any suitable and well known type. In using this instrument a position will be communicated to the observer and he will set the disk 56 to correspond with relation to index 59. This will cause the contact point to be moved around to the right or to the left and consequently when the objective tube 61 is in a direction corresponding with that to which disk 56 has been set, the controlled dirigible device will, if bisected by the sight wire, be in the desired path.

For the purposes of the present invention it is quite immaterial what particular method of wireless control is employed, the invention consisting as stated in a method for effecting the automatic operation through a suitable sighting device of any suitable system of wireless control. For the sake of clarity, however, I have diagrammatically shown in Fig. 11 one of the many arrangements through which a receiving apparatus on the controlled device can cause the operation of the steering member. In the same and assuming that the controlling station be the one illustrated in Fig. 7, 47' is the antenna, 48' is the ground connection. 49' is a suitable tuning device; 50' is a sensitive wave responsive device capable of being influenced by the waves given out when 41 is in contact with 42 in Fig. 7, and 51' is a sensitive wave responsive device capable of being influenced by the waves given out when 41 is in contact with 43 in Fig. 7. 52' is a source of current adapted to supply energy to circuit A or B. In circuit A is located a suitable relay magnet 53', in series with the wave responsive device 50' and the source of current 52'. In circuit B is a relay magnet 54', and a wave responsive device 51' adapted to be in series with the same source of current 52'; 55' is an armature adapted to be energized by the magnets 53' and 54'; 56' is an electromagnet as is also 57'; 58' is a source of current for the magnets 56' and 57'; 59' is a pivoted armature adapted to swing about point 60'; 61' is a rudder or other part which it is desired to operate. If waves are sent off at 42, Fig. 7, wave responsive device 50' will be energized closing circuit of electromagnet 53' and therefore attracting armature 55' so as to energize electromagnet 56' and attract armature 59'. If, on the other hand, waves are given off at 43, Fig. 7, wave responsive device 51' will be energized and armature 59' will be swung in the opposite direction.

It is understood that the drawings only show conventional ways whereby my invention may be carried into practice, but I do not limit myself in any way to the details therein shown or described.

I claim:—

1. A means of fire control from a control station for a wirelessly controlled dirigible device, comprising sighting means adapted to be focused on the target and sighting means adapted to be focused on the dirigible device, and means for automatically altering the status of the controlling station for correcting the course of the dirigible device.

2. A means of fire control for wirelessly steered devices, the combination with an apparatus for emitting radiations of different characteristics, of means for determining the wave characteristics emitted comprising a sighting element movable to follow the course of the target and an element adjustable to correspond with the desired course of the dirigible device, for steering the device controlled.

3. In a direction controlling apparatus for objects steered through the influence of radiant energy, the combination with an apparatus for emitting radiations of different characteristics, of means to determine the wave characteristics emitted, including a sighting device having a portion thereof movable to follow the course of the dirigible object and another portion adjustable to accord with the desired direction of the dirigible vessel, whereby the steering of the object is controlled.

4. A means of fire control from a control station for a dirigible device having a wirelessly controlled steering apparatus, comprising sighting means at said station, including a member adapted to be pointed at the target and a member adapted to be pointed at the dirigible device, said members controlling means to automatically alter the status of the controlling station and exert a correcting influence on the course of the dirigible device, when one of the said two members is set out of parallel alinement with the other.

5. A means of fire control for objects steered through the influence of radiant energy, the combination with an apparatus for emitting wave radiations of different characteristics from a controlling station, of means for determining the wave characteristics emitted, comprising sighting members adapted to be pointed at the target and at the object to be steered, for automatically altering the status of the wave radiating apparatus and to exert a correcting influence on the course of the object steered and for controlling same.

6. A means of fire control for objects operated by radiant energy from a control station, the combination with mechanism for emitting wave radiations, of sighting means at said station, including a member adapted to be pointed at the target and a member adapted to be pointed at the device to be controlled, and means for automatically altering the status of the controlling station and for correspondingly altering the steering course of the controlled device.

7. A means of fire control for objects steered through the influence of radiant energy, the combination with an apparatus for emitting radiations of different characteristics, elements adapted to be brought into pre-determined relation to each other, one of said elements adapted to be directed in a position bearing a certain relation to the target and the other element adapted to be pointed in a direction in relation to the steered object, and means when the two elements are in pre-determined relation to each other, for altering the status of the controlling station and for exerting a control of the course of the steered object.

8. In a means of fire control for objects steered through the influence of radiant energy of a controlling station, the combination with mechanism for emitting radiations of different characteristics, a sighting instrumentality, and means controlled thereby, for altering the status of the controlling station and means for controlling the course of the steered object.

9. In a direction controlling apparatus for objects steered through the influence of radiant energy, the combination with an apparatus for emitting radiant energy, of means to modify the character of the waves emitted, comprising a member adapted to be positioned with respect to a target and another member adapted to be positioned with respect to the steered object, whereby the steering of the object is controlled.

10. In a direction controlling apparatus for objects steered through the influence of radiant energy, the combination of means for emitting radiant energy and means comprising a member adapted to be positioned with respect to a target and another member adapted to be positioned with respect to the steered object, whereby the steering of the object is controlled.

EDW. F. CHANDLER.

Witnesses:
  H. L. SLOAN,
  FLORENCE OLSEN.